United States Patent [15] 3,659,053
Low et al. [45] Apr. 25, 1972

[54] METHOD AND APPARATUS FOR FREQUENCY-DIVISION MULTIPLEX COMMUNICATIONS BY DIGITAL PHASE SHIFT OF CARRIER

[72] Inventors: George M. Low, Deputy Administrator of the National Aeronautics and Space Administration with respect to an invention of; Lucien A. Couvillon, Jr., 1241 Gilmer Drive, Salt Lake City, Utah 84105

[22] Filed: Nov. 13, 1970

[21] Appl. No.: 89,212

[52] U.S. Cl. ........................179/15 FD, 178/50, 179/15 BC, 325/62, 332/21
[51] Int. Cl. ........................H04j 1/20
[58] Field of Search ........................179/15 R, 15 BM, 15 BC; 178/50, 67; 325/38 A, 62, 30; 332/21, 22; 340/170

[56] References Cited

UNITED STATES PATENTS

| | | | |
|---|---|---|---|
| 3,341,776 | 9/1967 | Doeltz | 178/67 |
| 3,487,169 | 12/1969 | Miyagi | 325/62 |
| 3,518,662 | 6/1970 | Nakagome | 325/38 A |
| 3,383,598 | 5/1968 | Sanogrs | 179/15 R |
| 3,349,181 | 10/1967 | Ito | 325/30 |
| 3,559,067 | 1/1971 | Genest | 325/38 A |
| 3,335,369 | 8/1967 | Priebe | 325/30 |
| 3,524,023 | 8/1970 | Whang | 325/30 |

*Primary Examiner*—Kathleen H. Claffy
*Assistant Examiner*—David L. Stewart
*Attorney*—Monte F. Mott, John R. Manning and Paul F. McCaul

[57] ABSTRACT

A system is disclosed for subcarrier frequency multiplexing to separate independent pulse-code-modulated data streams on a common carrier by modulating the carrier in a digital-to-phase shift converter by codes produced in an encoder as Boolean functions of the data, subcarriers, and mode control signals treated as binary variables. The mode control variable is included to program ratios between modulated subcarriers. Alternatively, $2^n$ registers can be provided to store *m*-bit words representing different carrier phases, where n is the number of squarewave subcarriers. The codes are then selected as functions of the subcarriers and data. The contents of the registers can be changed at will under control of a computer or data processing system.

13 Claims, 7 Drawing Figures

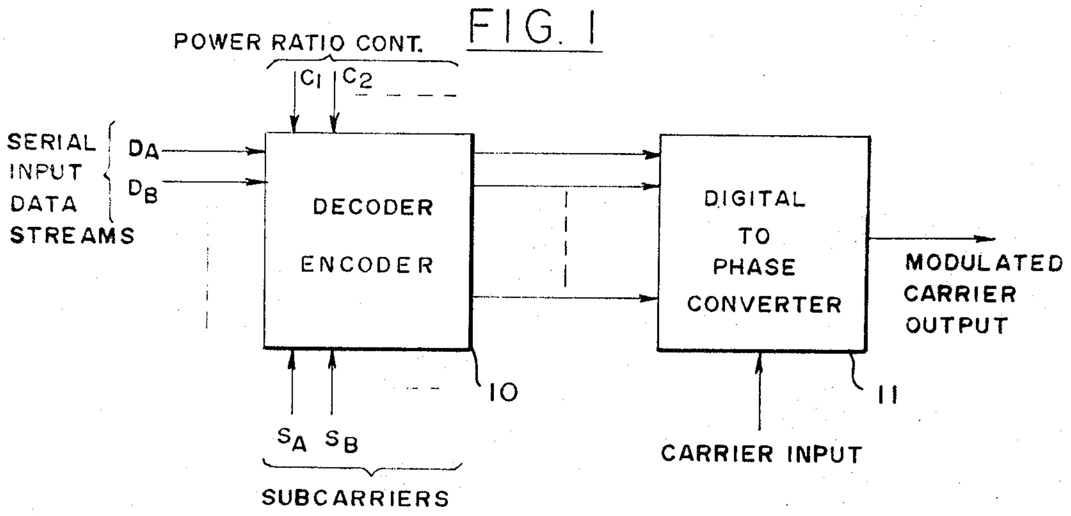
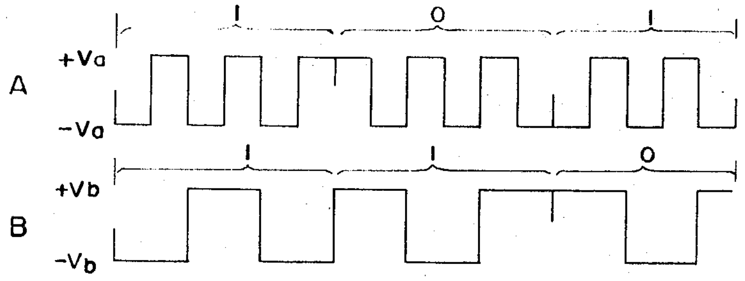
FIG. 2
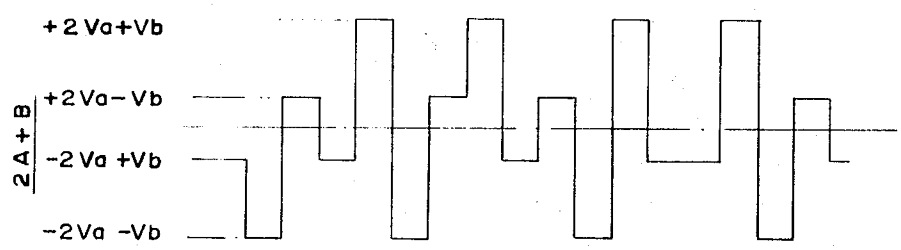
FIG. 3
FIG. 6
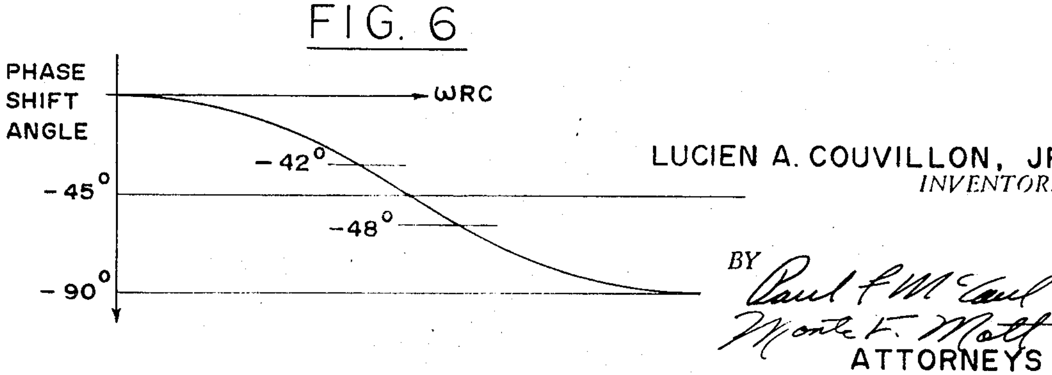
LUCIEN A. COUVILLON, JR.
*INVENTOR.*
BY Paul F. McCaul
Monte F. Mott
ATTORNEYS INVENTOR.
LUCIEN A. COUVILLON, JR.
BY
Paul F. McCaul
Monte F. Mott
ATTORNEYS

INVENTOR.
LUCIEN A. COUVILLON, JR.

BY [signatures]

ATTORNEYS

METHOD AND APPARATUS FOR FREQUENCY-DIVISION MULTIPLEX COMMUNICATIONS BY DIGITAL PHASE SHIFT OF CARRIER

ORIGIN OF THE INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

This invention relates to pulse-code-modulated (PCM) communications, and more particularly to a frequency-division multiplex system for transmitting a plurality of independent PCM data streams on a single carrier as a phase shift modulation that is the sum of phase shift modulations of subcarriers for the independent data streams.

In PCM communications, it has been standard practice to phase-shift modulate a subcarrier with binary data, and to modulate a carrier of higher frequency with the modulated subcarrier. To transmit a plurality of data streams simultaneously, separate subcarriers of different frequencies have been modulated, each by its own data stream. The modulated subcarriers are then combined through a summing amplifier in ratios appropriate to the desired allocation of power between subcarriers, and between the subcarriers and the carrier. Using an operational amplifier to add the modulated subcarriers, the ratios between modulated subcarriers can be selected by changing the values of resistors coupling the modulated subcarriers to the summing junction of the amplifier. This can be done by programmed digital control of analog switches to add or remove resistors in parallel and/or in series. However, the complexity of the analog switches and resistors limits the number of different ratios to a small number. Performance of the communications system is thereby compromised.

It is easily shown that under most conditions the use of squarewave subcarriers results in lower intermodulation losses in a phase-modulated carrier system than with sinusoidal subcarriers. In addition, the squarewaves are easier to generate and manipulate in a mostly digital system. The increased bandwidth required in the detector for efficient demodulation of squarewaves has not been a problem in modern telemetry systems.

Using squarewave subcarriers, the frequency-division multiplex system can be implemented with conventional phase modulators, one for each data stream, coupled to the summing amplifier. When two squarewave subcarriers of different frequencies are added, a four-level waveform is produced, and when n subcarriers of different frequencies are added a waveform of $2^n$ discrete level is formed by the summing amplifier. Considering only two subcarriers for simplicity, it is clear that modulation of the carrier with a four-level waveform results in a carrier whose phase at any instant is one of four discrete phases. The particular values of the discrete phases depend, of course, on the allocation of power between subcarriers and the carrier, i.e., the summing weights.

OBJECTS AND SUMMARY OF THE INVENTION

An object of this invention is to provide in a PCM frequency-multiplex technique for modulating and combining a plurality of subcarriers, and phase modulating a carrier, entirely with digital circuits.

Still another object is to provide a PCM frequency-multiplex technique in which power allocations may be readily programmed without the need for altering circuit parameters.

These and other objects of the invention are achieved by regarding the discrete carrier phases of a frequency multiplex system as Boolean functions of the data, subcarriers and power-ratio indices. A digital-to-phase converter receives an unmodulated carrier and transmits a modulated carrier the phase of which is at any given instant one of $2^n$ discrete phases, where $n$ is the number of subcarriers, each subcarrier being modulated by a separate stream of data bits with an assigned power-ratio index. The phase at each instant is controlled by a digital phase control word transmitted to the converter from an encoder in response to the aforesaid Boolean functions. In that manner the prior art combination of subcarrier modulators and a summing amplifier is replaced by a Boolean logic network for encoding carrier phase shift control words and a digital-to-phase converter which receives the control words and shifts the carrier frequency directly. Programmed control of the power ratios between subcarriers, and between the subcarriers and the carrier can also be achieved by storing the phase shift control words to be selected by the decoder in static registers.

These and other objects of the invention will best be understood from the following description when read in connection with the accompanying drawings. Although most easily described with reference to squarewave carriers, it should be understood that the invention is not limited to squarewave carriers. The novel features that are considered characteristic of the invention are set forth with particularity in the appended claims.

BRIEF DESCRIPTION OF THE DRAWINGS

FIG. 1 illustrates a block diagram of the present invention.

FIG. 2 illustrates two modulated subcarriers A and B of equal weight according to the prior art technique.

FIG. 3 illustrates the addition of the subcarriers of FIG. 2 with a double weighting of the subcarrier A.

FIG. 6 is a graph of phase angle shift as a function of $\omega RC$ which is helpful in understanding a preferred embodiment of the invention.

DETAILED DESCRIPTION OF THE INVENTION

Figure 4:
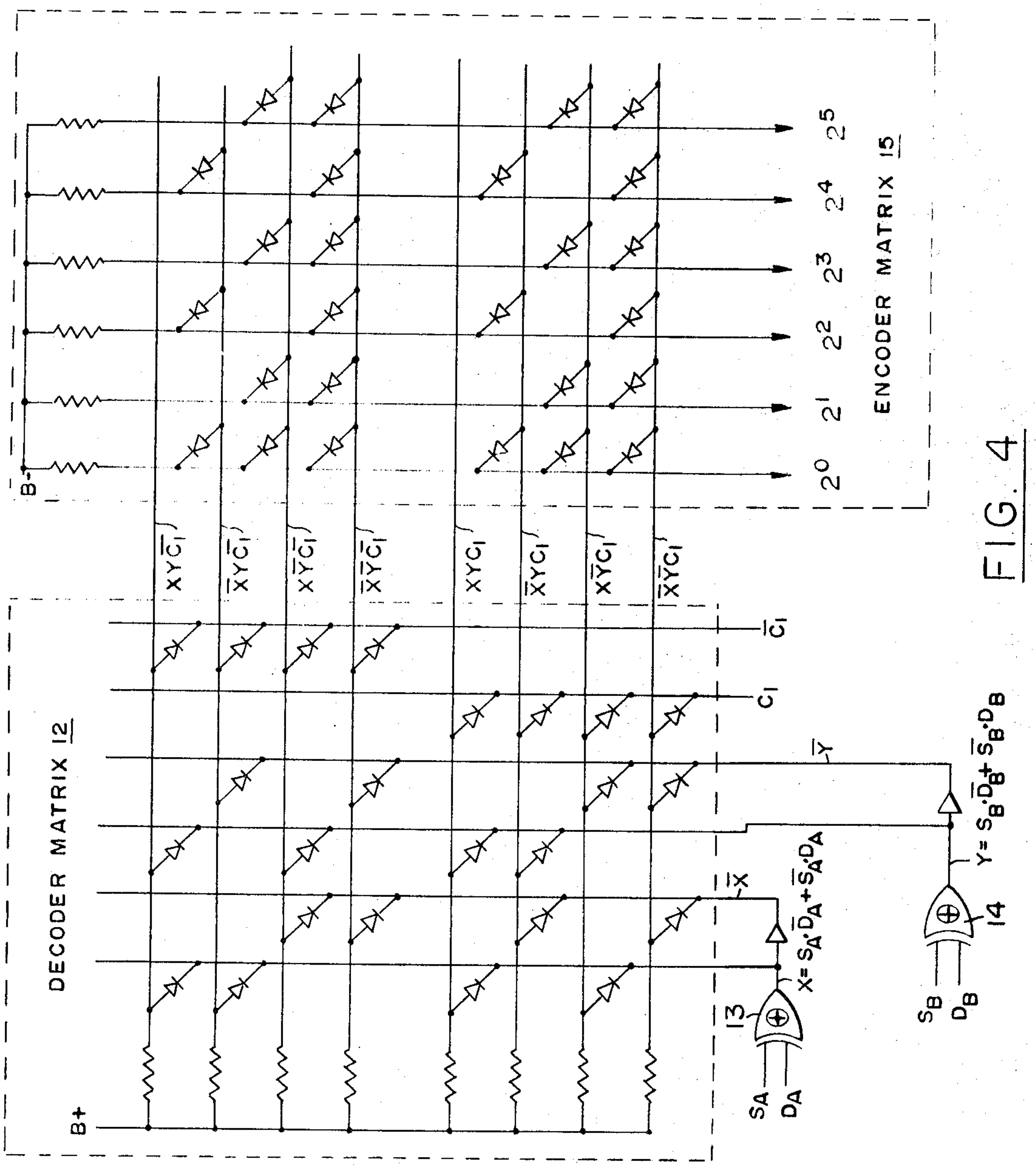
FIG. 4 illustrates one exemplary embodiment of an encoder for computer programmed control of power ratios.

Referring now to FIG. 1, a system for the subcarrier frequency multiplexing technique of the present invention can be illustrated by just two functional blocks. The first is a decoder/encoder 10 which receives a plurality of subcarriers $S_A$, $S_B$ . . . , each at a unique frequency in a relatively low range, typically 1 mHz. or less, a plurality of serial input data streams $D_A$, $D_B$ . . . , one for each subcarrier, and a plurality of input terminals $C_1$, $C_2$ . . . for control of power ratios.

Instead of modulating each subcarrier with a data stream, and then adding the modulated subcarriers in a linear summing amplifier to obtain a composite signal that modulates a carrier, the encoder responds to the subcarriers and data streams to convert a parallel $k$-bit word representing the data, subcarrier and control variables $C_1$, $C_2$ . . . , into an $m$-bit number representing the desired carrier phase at any given time. This may be accomplished by a pair of diode matrices. A first matrix decodes the $k$-bit word and a second matrix encodes the digital output of the first to transmit one of $2^n$ $m$-bit codes representing $2^n$ carrier phases. The $m$-bit code is then applied directly to a digital-to-phase (D/P) converter 11 to modulate a carrier.

The D/P converter receives the carrier and phase shifts it through one of $2^n$ small angles. The particular values of the discrete phases depend on the allocation of power between subcarriers, and between the subcarriers and the carrier as controlled by power ratio control signals. The phase angle shifted is small because the D/P converter operates at a relatively low frequency, e.g., 88 mHz., and the small angle is multiplied when the low frequency is multiplied to the microwave communication frequency, typically 2,295 or 8,448 mHz.

A review of what these two functional blocks are required to accomplish with reference to the prior art analog technique will assist in understanding the present invention. Assuming only two subcarriers $S_A$ and $S_B$ and two data streams $D_A$ and $D_B$ for simplicity, when modulated and added, a four-level waveform is produced by the prior art technique. Modulation of the carrier with this four-level waveform is then carried out in a linear phase modulator. FIG. 2 illustrates the two modulated subcarriers. The first waveform A is a subcarrier modulated by the data stream 101, and the second waveform B is a subcarrier modulated by the data stream 110. Both are of equal amplitude, but the carrier of the first waveform A is twice the frequency of the carrier of the second waveform B. Upon being added point by point, the waveform A is multiplied by a weighting factor of 2. The sum 2A+B appears as shown in FIG. 3 having at any instant one of four levels $+2V_a+V_b$; $+2V_a-V_b$; $-2V_a+V_b$; and $-2V_a-V_b$. Modulation of the carrier with this waveform results in a carrier whose phase at any instant is one of four discrete phases corresponding to one of four levels of the waveform 2A+B.

The disadvantage of the prior art analog technique is that the output of the linear summing amplifier is a wideband signal, and the output of the carrier modulator is sensitive to the amplitude of the wideband signal. Moreover, as noted hereinbefore, changing weighting resistors in an operational summing amplifier becomes too complex for more than two or three subcarriers. The present invention contemplates digital techniques in the decoder/encoder 10 for encoding numbers which represent the levels of the waveform composite waveform (2A+B in the example), and digital techniques for modulating the carrier by producing phase shifts of the carrier in proportion to the encoded numbers. While four numbers representing the four levels of the waveform of FIG. 3 will illustrate the invention, it should be understood that the number of subcarriers can be significantly increased without any complexity that cannot be readily implemented with digital circuits, preferably in an integrated circuit form.

Figure 5:
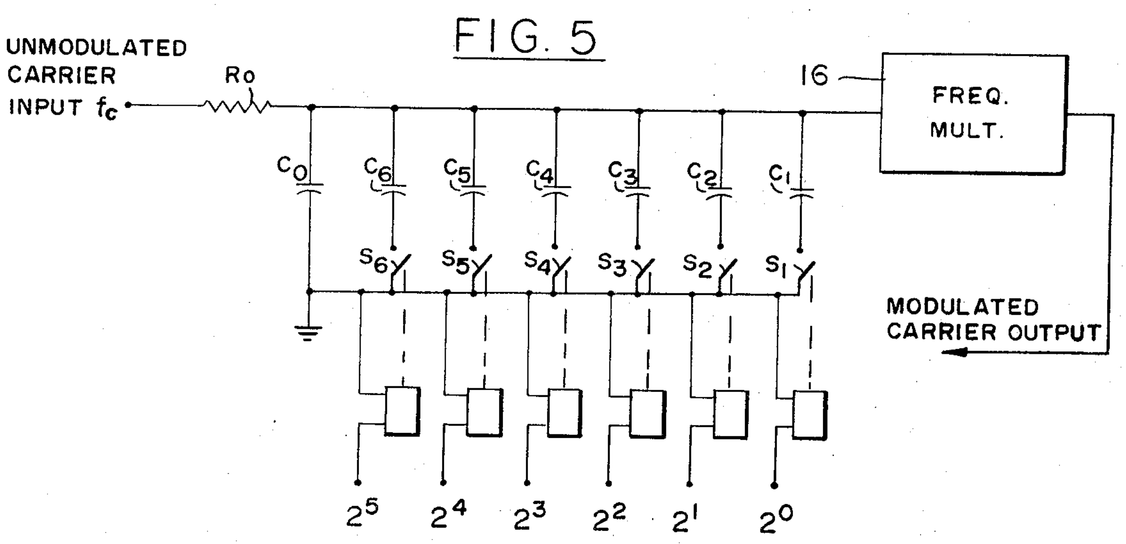
FIG. 5 illustrates an exemplary embodiment of a digital-to-phase converter in the present invention.

Referring now to FIG. 4, a diode decoder/encoder for the frequency-division multiplex of two subcarriers $S_A$ and $S_B$ is shown. As noted hereinbefore, the decoder/encoder is comprised of two diode matrices. A decoder matrix 12 receives the EXCLUSIVE-OR functions X and Y of the subcarriers $S_A$ and $S_B$, and the respective data streams $D_A$ and $D_B$ from conventional EXCLUSIVE-OR circuits 13 and 14. The signals X and Y, and complementary signals $\overline{X}$ and $\overline{Y}$, are then decoded in the decoder matrix 12 with the control signal $C_1$, and its complement $\overline{C}_1$, as shown. A true or binary-1 signal is represented by a positive voltage and a binary-0 by ground or a negative voltage. The outputs of the decoder matrix 12 are connected to an encoder matrix 15 which produces at output terminals one of 32 binary numbers representing the phase shifts for the situation of 2A+B illustrated in FIG. 3 when $C_1$ is true, and for the situation of A+2B not illustrated when the control signal $C_1$ is not true, i.e., when the signal $\overline{C}_1$ is positive. The discrete phases thus encoded into binary numbers and applied to the D/P converter shown in FIG. 5 represent the possible levels for a weighting factor of 2 applied to either the subcarrier $S_A$ or the subcarrier $S_B$.

While two bits at output terminals of the encoder 15 are adequate to define all possible phase shifts for the situation of 2A+B or A+2B, in practice there can be a larger number n of subcarriers and therefore a larger number of phase shift levels to be defined by bits provided in the pase shift control numbers transmitted to the D/P convert. The number $m$ of bits ($2^0$ through $2^5$) in the shift control numbers at the output terminals of the encoder matrix 15 sets the phase quantization (the smallest phase increment), which should be of the order of the overall system stability. A maximum of seven bits (1/128 resolution) would be adequate. However, for simplicity only six are shown in the exemplary embodiment of FIG. 4. Therefore, the D/P converter illustrated in FIG. 5 employs only six switches $S_1, S_2 \ldots S_6$ for connecting weighted capacitors $C_1, C_2 \ldots C_6$ in parallel with a fixed capacitor $C_0$, which helps set the operating point of the phase shift network at 45°. Although shown as relay switches, it should be understood that in practice the switches would be semiconductor switches, such as field-effect transistors or diodes for operation at high rates of data transmission and high subcarrier frequencies.

The weighting of the capacitors in the D/P converter shown in FIG. 5 will now be described with reference to FIG. 6 which shows a graph of phase shift angle as a function of $\omega RC$, where $\omega = 2\pi fc$ both the resistance R of a resistor $R_0$ and the carrier frequency $f_c$ are constant. To achieve phase shift as a linear function of a digital change in $C$, a value for $C$ is selected for a −45° phase shift with the switch $S_6$ closed, i.e., $C=C_0+C_6$. There is only a narrow range of linear operation of between approximately ±20° from the center (−45° phase shift). Therefore, the value of the capacitors $C_1$ to $C_6$ are selected to produce change in the phase shift within that range. A frequency multiplier 16 then not only increases the carrier frequency, but also multiplies the phase shift angles to the limits of ±90° at the eventual carrier frequency. For example, for narrow limits of ±30°, the multiplier 16 increases the carrier frequency by a factor of 30 and multiplies the range of phase shifts from ±3° to ±90°, i.e., multiplies each selected phase shift by a factor of 30.

If in the situation of FIGS. 2 and 3, the maximum positive and negative levels represent eventual phase shifts of +90° and −90°, the two intermediate levels represent eventual phase shift changes of +30° and −30°. The codes for these various phase shift levels are then selected around the mean value of −45°, as follows:

| Phase shift Levels | Code numbers $2^5$ | $2^4$ | $2^3$ | $2^2$ | $2^1$ | $2^0$ |
|---|---|---|---|---|---|---|
| +90 | 0 | 0 | 0 | 0 | 0 | 0 |
| +30 | 0 | 1 | 0 | 1 | 0 | 1 |
| −30 | 1 | 0 | 1 | 0 | 1 | 1 |
| −90 | 1 | 1 | 1 | 1 | 1 | 1 |

Thus, with a multiplier of 30 employed in the frequency multiplier, the capacitors $C_0$ to $C_6$ are selected for the phase shifts shown divided by 30 for a range of ±3° maximum from the center of −45° set by $\tan^{-1} \omega R\ (C_0+C_6) = -45°$, with the code 000000 producing a phase shift of $\tan^{-1} \omega R\ (C_0+C_1) = -42°$. The capacitors are binary weighted as to their capacitance so that the binary numbers 010101, 101011 and 111111 will produce the phase shift angles of −44°, −46° and −48°, respectively.

To be able to operate the converter with a larger range of phase shift angles for the capacitors, the multiplication factor of the frequency multiplier 16 may be decreased. However, if the same output carrier frequency is desired, the carrier input frequency $f_c$ must then be increased. In selecting the values for the capacitors, the higher carrier input frequency must be taken into account. The result will be that while larger capacitors may then be used for the increased range, the size of the capacitors will at the same time be reduced by the increase in carrier frequency. The optimum selection of phase shift range, carries frequency and multiplication factor must be made for each application. As the technology improves for producing solid state switches with smaller capacitance than about 0.25$pf$, the choices which can be made for different applications will be greater.

The example of two channels having equal data rates has been described with reference to FIGS. 2 through 5 for its simplicity to teach the principles of the present invention. However, in practice one communications channel will have a data rate significantly greater than the other channel, such as 8,000 bits/sec. while the other channel has a data rate of 8 bits/sec. In such a practical situation, the power allocation would be in proportion to the data rate such that the waveform in FIG. 3 would actually be 1,000 A+B. Additional channels would be accommodated in the same manner with a larger number of mode control signals.

Figure 7:
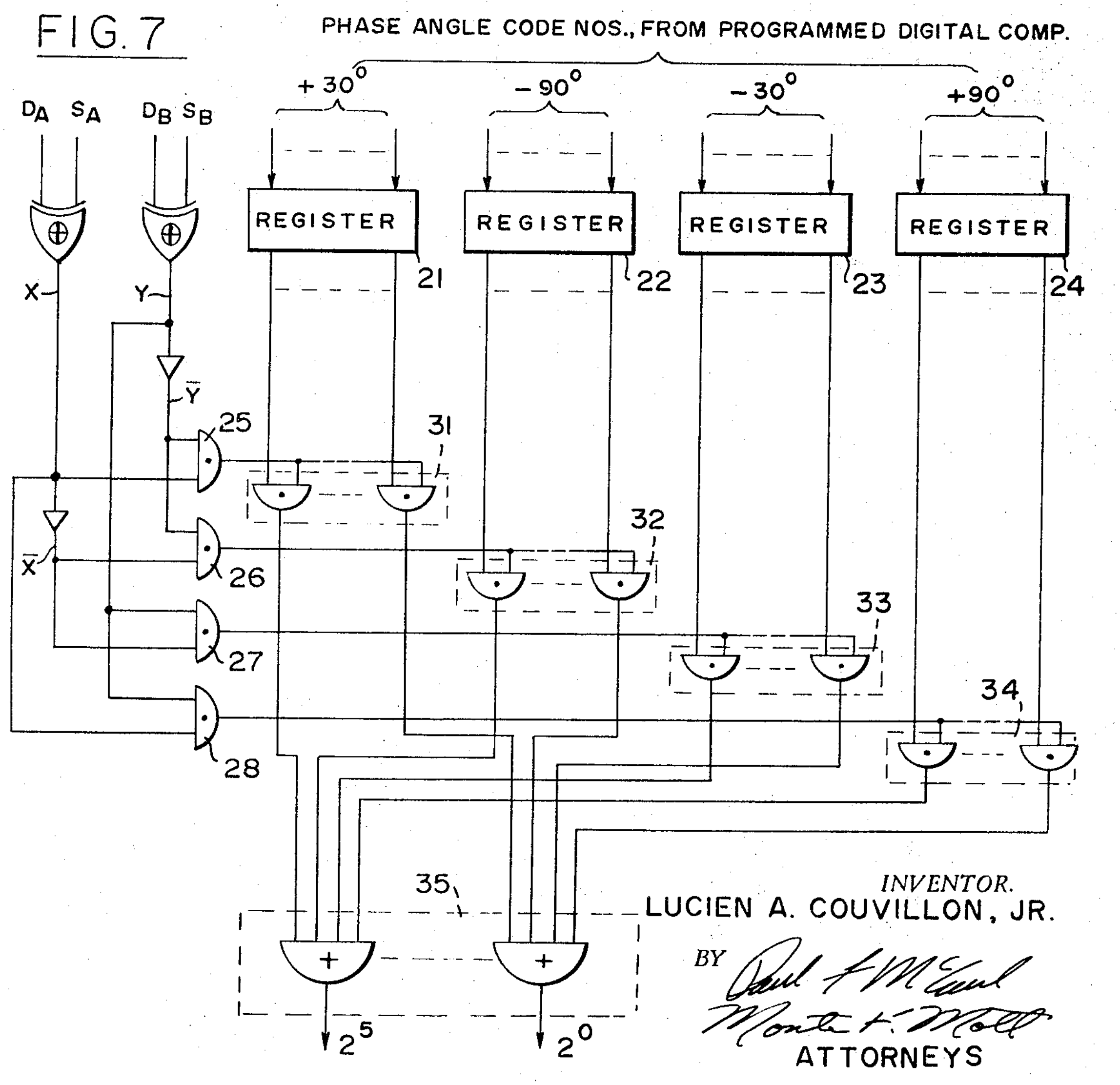
FIG. 7 is an alternative embodiment of the encoder in the present invention.

Referring now to FIG. 7, an alternative decoder/encoder 10 is illustrated. It consists of a plurality of storage registers 21 to 24 which can be loaded with a set of phase control numbers for given mode by a programmed computer. A simplified logic network responds to the subcarriers and data streams to select the output of one of the four registers.

The logic network first forms the EXCLUSIVE-OR function X and Y, and the complements $\overline{X}$ and $\overline{Y}$, as in the encoder/decoder of FIG. 4. AND-gates 25 to 28 then respond to those signals to select the phase shift code numbers from the respective registers 21 to 24 by enabling one of four banks 31 to 34 of AND-gates for parallel transfer of the selected phase shift code number to the D/P converter via a bank of OR-gates 35.

This alternative encoder/decoder makes it possible to easily and quickly change power ratios in a frequency multiplexing system where external signals are available for control. The mode control signals $C_1$, $C_2$ . . . referred to in connection with description of the first embodiment would then be implicit in the signals, which could be program stored in a computer for control of communications. Since virtually every space vehicle has a computer aboard, this alternate embodiment would be ideal for space communications applications.

Although squarewave subcarriers have been employed in the preferred embodiments, it should be appreciated that sinusoidal subcarriers can also be employed by representing the subcarriers in digital form through conventional approximation logic such as a read-only memory before decoding. The encoder can then form the phase control words as Boolean functions of data, subcarriers and power ratio indices, where the indices are control signals if a diode matrix encoder is used, or are implied in programmed phase shift control words stored in static registers for selection by a decoder if static registers are used for the encoder.

Although particular embodiments of the invention have been described and illustrated herein, it is recognized that modifications and variations may readily occur to those skilled in the art, such as substitution of other active elements or transistors of opposite conductivity types. Consequently, it is intended that the claims be interpreted to cover such modifications and variations.

What is claimed is:

1. A method of modulating a carrier signal with a plurality of $n$ data-modulated subcarriers, where $n$ is an arbitrary integer, each subcarrier occurs at a unique frequency, and said data comprises a plurality of streams of serial binary digits to be transmitted, a different stream being associated with each subcarrier, comprising the steps of digitally modulating each subcarrier with its associated data stream to provide said data modulated subcarriers in digital form, assigning indices of power ratios to said data modulated subcarriers which, when applied, would produce weighted modulated subcarriers, continually decoding said data modulated subcarriers to determine which of $2^n$ unique combinations of possible amplitude levels the algebraic sum of data modulated subcarriers would result at any given time if said data modulated subcarriers were to be weighted by power ratio indices and algebraically added, and generating a unique one of a $2^n$ phase shift selecting signals corresponding to the determination made, and continually phase shifting said carrier in accordance with said phase shift selecting signals as said signals are generated in sequence.

2. A method as defined in claim 1 wherein said indices of power ratios are assigned in the form of binary coded signals, and said step of decoding consists of generating said unique phase shift selecting signals as a Boolean function of said data streams, subcarriers in digital form and said binary coded signals representing indices of power ratios.

3. A method as defined in claim 2 wherein said step of continually phase shifting said carrier include encoding one of $2^n$ unique digital phase shift control words in response to a corresponding one of $2^n$ unique phase shift selecting signals generated in said decoding step, and controlling the phase shift of said carrier by continually modifying a phase shift network in response to said unique digital phase shift control words.

4. A method as defined in claim 2 wherein said step of continually phase shifting said carrier includes a step of frequency multiplication as the last step, and direct phase shifting in response to a digital phase shift control word is carried out on a preliminary carrier signal of a frequency equal to the frequency of said modulated carrier divided by the multiplication factor of said frequency multiplication step, whereby the total phase shift required at any given time in direct response to a digital phase shift control word is only the required phase shift angle divided by the multiplication factor of said frequency multiplication step.

5. A method as defined in claim 2 wherein said indices of power ratios are assigned by providing digital phase shift control words in static form for selection in response to said unique phase shift selecting signals generated in said decoding step, and wherein said step of continually phase shifting said carrier includes controlling the phase shift of said carrier by continually modifying a phase shift network in response to said unique digital phase shift control words.

6. A method as defined in claim 5 wherein said step of continually phase shifting said carrier includes a step of frequency multiplication as the last step, and direct phase shifting in response to a digital phase shift control word is carried out on a preliminary carrier signal of a frequency equal to the frequency of said modulated carrier divided by the multiplication factor of said frequency multiplication step, whereby the total phase shift required at any given time in direct response to a digital phase shift control word is only the required phase shift angle divided by the multiplication factor of said frequency multiplication step.

7. In a frequency multiplex system, apparatus for modulating a carrier signal with a plurality of subcarrier, where each subcarrier occurs at a unique frequency, and said data comprises a plurality of streams of several binary digits to be transmitted with power ratios specified in advance, a different stream being associated with each subcarrier, comprising means for sequentially generating phase shift selecting signals as Boolean functions of said subcarriers in digital form, associated data streams and predetermined power ratios, and means for phase shifting said carrier signal to an extent indicated by said phase shift selecting signals as said signals are generated in sequence.

8. Apparatus as defined in claim 7 wherein said power ratios are specified by digital signals said means for generating phase shift selecting signals, comprises means for digitally modulating each subcarrier with its associated data stream to provide said data modulated subcarriers in digital form, means for continually decoding said data modulated subcarriers and said power ratio signals to produce a unique signals representing phase shift angles required for said carrier signal at all times, means responsive to said signals representing phase shift angles for continually encoding corresponding digital phase shift control words, and means responsive to said digital phase shift control words for continually phase shifting said carrier signal in accordance with the code of said phase shift control words.

9. Apparatus as defined in claim 8 wherein said phase shifting means comprises an RC filter having an input terminal and an output terminal, the RC product of said digital filter being digitally controlled by said phase shift control words, where R is the value of series resistance coupling said carrier signal from input terminal to said output terminal, and $C$ is the value of shunt capacitance between said resistance and said output terminal.

10. Apparatus as defined in claim 9 wherein said phase shifting means includes a frequency multiplier connected to said filter output terminal, and wherein said phase shifting means responds to said phase shift control words to produce phase shift angles equal to required carrier phase shift angles divided by the multiplication factor of said frequency multiplier, whereby said phase shifting means may be operated over a full range of phase shift angles substantially less than ±90° for a full range of phase shift modulation of said carrier of ±90°.

11. Apparatus as defined in claim 7 wherein said means for generating phase shift selecting signals comprises, means for digitally modulating each subcarrier with its associated data stream to provide said data modulated subcarriers in digital form, means for continually decoding said data modulated subcarriers to produce unique signals representing all possible binary combinations of said modulated subcarriers, programmable means for storing in digital form digital phase shift control words representing phase shift angles for all of said binary combinations, one control word for each possible combination, said control words being precoded to represent required phase shift angles for said specified power ratios, means responsive to digital phase shift control words for continually phase shifting said carrier signal in accordance with the code of said phase shift control words, and means responsive to said unique signals produced by said decoding means for transmitting to said phase shifting means said digital phase shift control words stored in said programmable storage means.

12. Apparatus as defined in claim 11 wherein said phase shifting means comprises an RC filter having an input terminal and an output terminal, the RC product of said digital filter being digitally controlled by said phase shift control words, where R is the value of series resistance coupling said carrier signal from the input terminal to said output terminal, and *C* is the value of shunt capacitance between said resistance and said output terminal.

13. Apparatus as defined in claim 12 wherein said phase shifting means includes a frequency multiplier connected to said filter output terminal, and wherein said phase shifting means responds to said phase shift control words to produce phase shift angles equal to required carrier phase shift angles divided by the multiplication factor of said frequency multiplier, whereby said phase shifting means may be operated over a full range of phase shift angles substantially less than ±90° for a full range of phase shift modulation of said carrier of ±90°.

* * * * *